July 5, 1938.  C. H. SHAW  2,123,122
INSULATOR AND HANGER FOR SAME
Filed Aug. 6, 1935
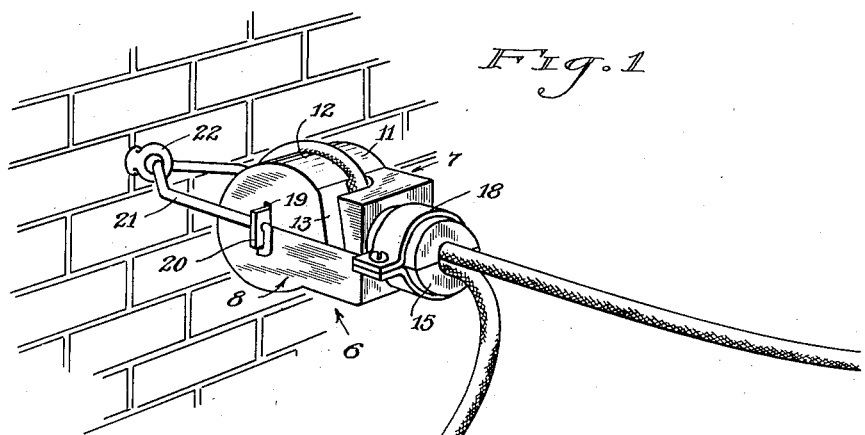
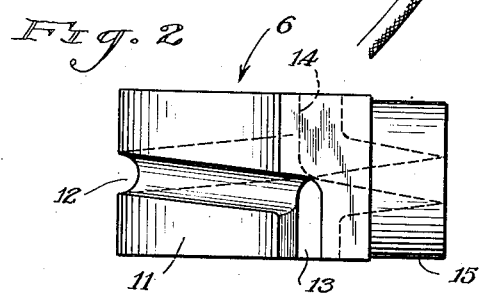
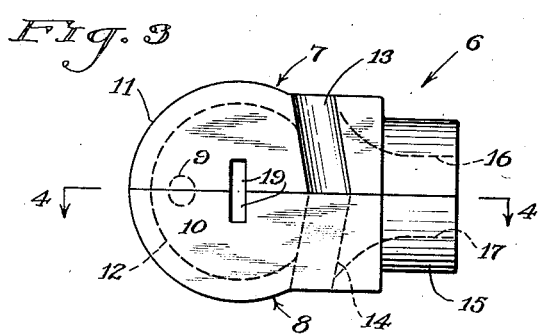
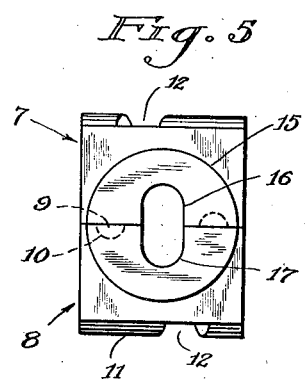
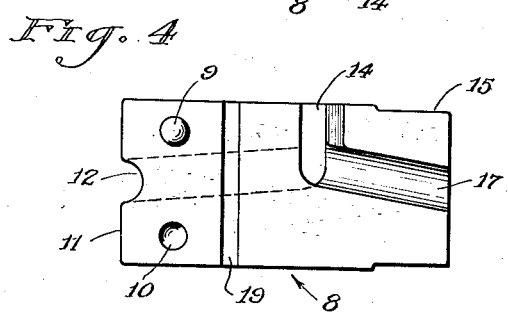
Charles H. Shaw
INVENTOR
BY Victor J. Evans & Co.
ATTORNEY Patented July 5, 1938

2,123,122

UNITED STATES PATENT OFFICE 2,123,122

INSULATOR AND HANGER FOR SAME

Charles H. Shaw, Inwood, N. Y.

Application August 6, 1935, Serial No. 35,007

6 Claims. (Cl. 173—314)

This invention relates to hanger devices for the support of electric cables and the like and more particularly to insulators for supporting the lead-in cable on buildings.

The installations of lead-in cables or other electric conductors, being subject to extreme weather conditions, have in the past resulted in troublesome conditions due to the wear of the cable on the insulator resulting from the abrasion or other damage to the cable covering.

In view of the above it is the primary object of my invention to provide an insulator and a hanger for same which will effect the support of lead-in cables in a highly satisfactory manner so as to assure a durable and highly satisfactory installation.

A further object of my invention is to provide a novel form of insulator block which will facilitate the simple installation of lead-in cables by the accepted method involving the practical formation of the cable loop.

Another object of my invention is to provide a simple form of insulator, the component halves of which, being identical, may be formed from the same mold thereby resulting in an economy of manufacture.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is a perspective view of a typical installation of a lead-in cable illustrating the use of my insulator and hanger.

Fig. 2 is a top elevational view of the complete insulator omitting the hanger and clamp for same.

Fig. 3 is a side elevational view of the insulator as shown in Fig. 2.

Fig. 4 is a central sectional view taken on line 4—4 of Fig. 3; and

Fig. 5 is an elevational view of the clamp end of the insulator.

Referring now to the drawing for a more detailed description thereof, the numeral 6 indicates the insulator of my invention which comprises an upper section 7 and a lower section 8, both of which are maintained in proper registry with each other by a suitable means including the bosses 9 and the recesses 10 formed on the abutting surfaces of the insulator sections 7 and 8. With the sections 7 and 8 assembled for use as illustrated, the component structure comprises a cylindrical portion 11 in the periphery of which is formed a half round groove 12 of a diameter suitable to fit snugly a portion of the cable to be installed. By reference to Fig. 2 it will be noted that the groove 12 is helical in its preferred form and therefore diverging to opposite sides of the respective sections 7 and 8. Altho the helical form of the groove 12 is preferred, it will be apparent that the same may be formed substantially flat without appreciably reducing its function.

The respective ends of the groove 12 terminate in lateral slots 13 and 14 formed substantially perpendicular to the adjoining surfaces of the respective sections 7 and 8 but preferably at a slight inclination, as shown, so as to facilitate the installation of the cable therein, as hereinafter described. The portion of the insulator 6 beyond the cylindrical portion 11 is formed as a rectangular block from the end of which projects a cylindrical collar 15. In each of the sections 7 and 8 and centrally disposed within the collar 15 are formed longitudinal grooves 16 and 17, each of which is adapted to receive portions of the electric cable and to hold same securely when the sections 7 and 8 are held together by means such as the clamp 18 shown in Fig. 1. The grooves 16 and 17 diverge from each other toward the cylindrical portion 11 to terminate in the lateral grooves 13 and 14 so that the composite channel thus formed including the groove 12 will contain the electric cable formed in a convenient loop, as shown in Fig. 1.

It will be noted also that the grooves 16 and 17, in order to be contiguous with the ends of the groove 12, are divergent from each other toward the portion 11 thus causing the cable when installed to assume a substantially zig-zag form in the horizontal plane, as shown more clearly in Fig. 2. In view of this latter arrangement, the grooves 13 and 14 need only extend to the longitudinal center of their respective sections 7 and 8 so that the strength of the remaining sections beyond the grooves 13 and 14 is not unnecessarily reduced in size.

The connection of the hanger to my insulator 6 is effected by providing each section of the latter with grooves 19 forming a slot into which a cross bar 20 is engaged, see Fig. 1. Into the projecting ends of the cross bar 20 are cut apertures in which are engaged hooked ends of a U-shaped hanger bar 21, the bale of which may be flexibly secured to a building wall as by the eyelet 22.

In the installation of a lead-in cable involving the use of my improved insulator block and hanger the eyelet 22 is installed and the hanger bar 21 is placed therein. A loop is formed of the cable, which loop is placed in the groove 12 of the insulator 6, the contiguous portions of the cable being placed into the respective lateral grooves 13 and 14 and thence inserted into the clamp grooves 16 and 17. The cross bar 20 is simultaneously hooked onto the ends of the hanger bar 21 and inserted into the groove 19, after which the sections 7 and 8 of the insulator 6 are brought together and so secured by placing and tightening the ring clamp 18. The weight of the suspended portion of the cable will effect a pull on the looped portion thereof which, being engaged in the groove 12, will be suitably held in place by a snubbing action, thus insuring a highly satisfactory and practical installation.

What is claimed as new is:

1. A device of the character described, comprising an insulating block consisting of a pair of similar, connected, separable parts, each of said parts having a groove on its outerside at the rearward portion and on its innerside at the forward portion, said grooves being adapted to receive and securely hold a looped conductor, each of said parts having cutaway parts formed therein defining a slot in the interior portion of said block communicating between said outerside and innerside grooves.

2. A device of the character described, comprising an insulating block consisting of a pair of similar, connected, separable parts, each of said parts having a groove on its outerside at the rearward portion and on its innerside at the forward portion, means communicating between said innerside and outerside grooves, said grooves being adapted to receive and securely hold a looped conductor, the grooves on the innerside portion being at an angle relative to the grooves on outerside portion.

3. A device of the character described comprising an insulating block consisting of a pair of similar, connected, separable parts, each of said parts having a groove on its outer side at the rearward portion and on its inner side at the forward portion, said grooves being adapted to receive and securely hold a looped conductor, each of said parts having cutaway portions formed therein refining a slot in the interior portion of said block communicating between said outerside and innerside grooves in the respective faces of the block.

4. A device of the character described comprising an insulating block consisting of a pair of similar, connected, separable parts, each of said parts having a groove on its outer side at the rearward portion and on its inner side at the forward portion, means communicating between said innerside and outerside grooves, said grooves being adapted to receive and securely hold a looped conductor, and means for supporting said block, said means comprising a bar and a slot provided in each of said separable parts adapted to receive and hold said bar.

5. A device of the character described comprising a block of insulating material having a peripheral groove in the rearward portion terminating intermediate the block at opposed sides thereof, a port extending longitudinally within the forward end of the block, and slots in the sides of said block other than the sides wherein said peripheral groove terminates presenting a confluence of the terminals of said groove into said port whereby to securely hold a tensioned looped conductor on said block.

6. A device of the character described comprising an insulating block consisting of a pair of connected separable similar parts, a helical groove formed in and at least partially circumscribing the periphery of the rearward portion of said block terminating intermediate the block at opposed sides thereof, each of said parts having a groove at the forward portion on the innerside of said block, the respective innerside grooves being disposed to diverge from each other, and slots in opposed sides of the respective parts other than the sides wherein said peripheral groove terminates, each slot communicating between a terminal of said helical groove and the corresponding innerside groove whereby to securely hold a looped conductor on said block.

CHARLES H. SHAW.